(12) United States Patent
Chen et al.

(10) Patent No.: US 12,011,015 B2
(45) Date of Patent: Jun. 18, 2024

(54) LOW-SUGAR OR SUGAR-FREE TYPE PECTIN SOFT CANDY AND PREPARATION METHOD THEREOF

(71) Applicant: Sirio Healthcare (Anhui) Co., Ltd, Anhui (CN)

(72) Inventors: Qiong Chen, Guangdong (CN); Shaohua Cui, Anhui (CN); Qian Qiao, Anhui (CN); Suqiong Fang, Guangdong (CN)

(73) Assignee: Sirio Healthcare (Anhui) Co., Ltd, Ma'anshan (CN)

( * ) Notice: Subject to any disclaimer, the term of this patent is extended or adjusted under 35 U.S.C. 154(b) by 18 days.

(21) Appl. No.: 17/606,907

(22) PCT Filed: Mar. 9, 2021

(86) PCT No.: PCT/CN2021/079732
§ 371 (c)(1),
(2) Date: Oct. 27, 2021

(87) PCT Pub. No.: WO2021/180064
PCT Pub. Date: Sep. 16, 2021

(65) Prior Publication Data
US 2023/0028482 A1    Jan. 26, 2023

(30) Foreign Application Priority Data
Mar. 12, 2020  (CN) .......................... 202010170140.9

(51) Int. Cl.
*A23G 3/42* (2006.01)
*A23G 3/38* (2006.01)

(52) U.S. Cl.
CPC ........ *A23G 3/38* (2013.01); *A23G 3/42* (2013.01)

(58) Field of Classification Search
CPC .................................................... A23G 3/42
See application file for complete search history.

(56) References Cited

U.S. PATENT DOCUMENTS

2018/0228179 A1*  8/2018  Dolmer ................. A23G 3/366

FOREIGN PATENT DOCUMENTS

| CN | 102246882 A | 11/2011 |
|----|----|----|
| CN | 106106971 A | 11/2016 |
| CN | 107835641 A | 3/2018 |
| CN | 108354056 A | 8/2018 |
| CN | 108740257 A | 11/2018 |
| CN | 111567662 A | 8/2020 |
| WO | WO-2009/154887 A1 | 12/2009 |
| WO | WO-2016/198440 A1 | 12/2016 |
| WO | WO-2021/180064 A1 | 9/2021 |

OTHER PUBLICATIONS

Machine translation of CN106106971A. pp. 1-14. Publication date: Nov. 16, 2016 (Year: 2016).*
International Search Report Translation for International Application No. PCT/CN2021/079732 dated May 20, 2021.
Extended European Search Report for EP Application No. 21767383.9 dated Jan. 3, 2023.
Shaozeng et al., "Practical Daily Chemicals Manufacturing Technology for Township Enterprises", Chemical Industry Press, p. 287, (1993).
Zhaoyang, "Candy Manufacturing", Light Industry Press, p. 74 (1965).

* cited by examiner

*Primary Examiner* — Jenna A Watts
(74) *Attorney, Agent, or Firm* — Foley Hoag LLP; Dana M. Gordon

(57) ABSTRACT

The present invention relates to a low-sugar or sugar-free type pectin soft candy and a preparation method thereof. The soft candy comprises sugar alcohol, glycerin and pectin, wherein the sugar alcohol comprises maltitol, a soluble sugar alcohol selected from erythritol, isomalt, xylitol, lactitol and mannitol, as well as sorbitol, which is characterized in that the weight ratio of the maltitol, the soluble sugar alcohol and the sorbitol is 1:(0.10-0.65):(0.03-0.26), and the weight ratio of the maltitol to the glycerol is 1:(0.04-0.52).

10 Claims, 2 Drawing Sheets

LOW-SUGAR OR SUGAR-FREE TYPE PECTIN SOFT CANDY AND PREPARATION METHOD THEREOF

RELATED APPLICATIONS

This application is the U.S. national phase of International Patent Application No. PCT/CN2021/079732, filed Mar. 9, 2021; which claims the benefit of Chinese Application No. 202010170140.9, filed Mar. 12, 2020.

TECHNICAL FIELD

The invention relates to the field of food, particularly to a soft candy food processing technology. Specifically, the present invention relates to a low-sugar or sugar-free type pectin soft candy and a preparation method thereof.

BACKGROUND ART

As a functional food in our daily life, nutritional soft candies are becoming more and more popular among consumers. Most candies on the market use granulated sugar and syrup as sweeteners. For people with diabetes, granulated sugar and syrup can cause blood glucose to rise. As one of the important consumers of candies, children and adolescents who have long-term consumption of candies with granulated sugar and syrup as sweeteners can have their tooth decayed; and young women who are of another major consumer group of candies will control their sugar intake due to factors such as gaining weight. In addition, with consumers' in-depth understanding of natural and healthy concepts, vegetable gum-based soft candies have become a good choice for consumers. Pectin soft candies have the advantages of soft texture, fine structure, refreshing mouthfeel, good temperature resistance, long shelf life, etc.; secondly, pectin as a plant-derived gel is very popular among vegetarians, therefore, the demand for low-sugar or sugar-free type pectin soft candies is becoming more apparent. However, the existing low-sugar or sugar-free type pectin soft candy products have many problems, the quite prominent one among which is the phenomenon of "water coming out" during storage.

The prior art solutions to the phenomenon of water coming out during the storage of low-sugar or sugar-free type pectin soft candies are mainly focused on the development of sealing devices and the use of desiccants, but there is very little improvement in the structure itself of low-sugar or sugar-free type pectin soft candies.

CN103005118B provides an iron-supplemented soft candy and a preparation method thereof, so that the iron-supplemented soft candy product is more stable in quality, and the phenomenon of water coming out of the candy body is avoided. However, this patent mainly solves the problems of instability and being prone to water coming out of the candy body of iron-added health-care soft candies. By selecting matrix sugar components (agar, gelatin, pectin and maltitol) that are compatible with raw materials for iron-supplementing, the interaction between matrix sugar components and raw materials for iron-supplementing is avoided, and the stability of the soft candy gel system is maintained, thereby the problem of water coming out of the candy body after long-term storage can be solved. In addition, the matrix sugar components are only suitable for methemoglobin chloride, and have no effect on other raw materials for iron-supplementing.

CN109566828A discloses a sugar-free type pectin soft candy containing multiple vitamins and a preparation method thereof, wherein the soft candy contains 20-60% of liquid maltitol, 20-60% of isomalt, 1-4% of pectin and multivitamins. CN106106971A discloses a sugar-free type pectin soft candy containing milk calcium and a preparation method thereof, wherein the sugar-free type pectin soft candy contains 100-800 parts of maltitol, 1-60 parts of sorbitol, 10-60 parts of erythritol, 15-60 parts of pectin, 1-40 parts of milk calcium and 1-12 parts of sour agent. CN107835641A discloses glycerin-based gum candy and foam candy products with probiotics, which contain 10%-40% of glycerin, 40%-75% of at least one sugar or polyol or mixtures thereof, at least one hydrocolloid and at least one probiotics. CN110049689A discloses a glycerin-and-protein-based foam candy product with probiotics, which contains at least 5% of glycerin, a sugar or polyol or a mixture thereof, at least one protein other than gelatin, at least one hydrocolloid and at least one probiotics. However, none of these patent applications solves the problem of water coming out during the storage of low-sugar or sugar-free type pectin soft candies, and only involves the addition of nutrients or the production of specific products.

Therefore, there is still a need for low-sugar or sugar-free type pectin soft candy products with good stability for the product appearance.

SUMMARY OF THE INVENTION

An object of the present invention is to provide a low-sugar or sugar-free type pectin soft candy and a preparation method thereof, so that the low-sugar or sugar-free type pectin soft candy can be more stable in quality, and the phenomenon of water coming out of the candy body can be avoided. Another object of the present invention is to provide a low-sugar or sugar-free type pectin soft candy and a preparation method thereof, so that the candy body of the low-sugar or sugar-free type pectin soft candy is neither too hard nor too soft, and the appearance and mouthfeel are better.

One aspect of the present invention relates to a soft candy comprising sugar alcohol, glycerin and pectin, wherein the sugar alcohol comprises maltitol, one or more soluble sugar alcohols selected from erythritol, isomalt, xylitol, lactitol and mannitol, as well as sorbitol, which is characterized in that the weight ratio of the maltitol, the soluble sugar alcohol and the sorbitol is 1:(0.10-0.65):(0.03-0.26), and the weight ratio of the maltitol to the glycerol is 1:(0.04-0.52).

In some embodiments, the weight ratio of the maltitol, the glycerol and the pectin is 1:(0.04-0.52):(0.03-0.11). In some embodiments, the soft candy is of a low-sugar or sugar-free type. In some embodiments, the sugar alcohol consists of the maltitol, the soluble sugar alcohol, and the sorbitol. In some embodiments, the soluble sugar alcohol is erythritol. In some embodiments, the sugar alcohol is in solid or liquid form. In some embodiments, the soft candy contains 10%-98% of maltitol, 2.0%-20% of soluble sugar alcohol, 0.5%-18% of sorbitol, 0.5%-17% of glycerol and 0.5%-5% of pectin. In some embodiments, the soft candy further comprises one or more ingredients selected from the group consisting of a sour agent, a fruit juice, a nutritional ingredient, an edible essence and an edible colorant. In some embodiments, the sour agent is selected from one or more of the following: citric acid, malic acid, lactic acid, tartaric acid, fumaric acid, and edible salts thereof. In some embodiments, the edible salt is sodium citrate and/or potassium citrate. In some embodiments, the fruit juice is selected from one or more of the following: apple juice, raspberry juice, blueberry juice, strawberry juice, cherry juice, lemon juice, peach juice, orange juice, banana juice, pear juice, sugar cane juice, compound berry juice, grape juice, jujube juice, lychee juice, wolfberry juice, pomegranate juice, blackcurrant juice, carrot juice, raspberry juice, noni fruit juice, ebony juice, fermented fruit and vegetable juice, cranberry juice, green plum juice, sea buckthorn juice, kiwi juice, mango juice, celery juice and carrot juice. In some embodiments, the nutritional ingredient is one or a mixture of two or more of the nutritional ingredients allowed to be used according to the GB14880 current standards for use of nutritional ingredients. In some embodiments, the nutritional ingredient is selected from one or more of the following: minerals, vitamins, amino acids, proteins, polyphenols, glycosides, flavonoids, lipids, polysaccharides, terpenes, sterols, omega polyunsaturated fatty acids, yeast ß-glucan, L-carnitine, melatonin and coenzyme Q10. In some embodiments, the minerals are selected from one or more of the following: calcium, iron, zinc, selenium, magnesium, potassium, sodium, manganese, and copper. In some embodiments, the vitamins are selected from one or more of the following: vitamin A, vitamin D, vitamin E, vitamin C, B-vitamins, folic acid, and biotin. In some embodiments, the amino acids are taurine and/or lysine. In some embodiments, the omega polyunsaturated fatty acid is an omega-3 polyunsaturated fatty acid. In some embodiments, the omega-3 polyunsaturated fatty acid is DHA or EPA. In some embodiments, the nutritional ingredient is milk mineral salt. In some embodiments, the edible essence is selected from one or more of the following: orange essence, lemon essence, strawberry essence, raspberry essence, blueberry essence, peach essence, cola essence, cherry essence, banana essence, pear essence, black carrot essence, compound berry essence, grape essence, jujube essence, lychee essence, wolfberry essence, pomegranate essence, black currant essence, carrot essence, raspberry essence, noni fruit essence, ebony essence, fermented fruit and vegetable essence, cranberry essence, green plum essence, sea buckthorn essence, kiwi essence, mango essence, mixed fruit essence, cucumber essence, caramel essence, coffee essence and honey essence. In some embodiments, the edible colorant is selected from one or more of the following: annatto, cochineal, beta carotene, turmeric, caramel, titanium dioxide, lemon yellow, brilliant blue, allura red, capsicum red, grape skin red, Monascus colour, beet red, gardenia blue, gardenia yellow, radish red, sunset yellow, sodium copper chlorophyll, iron oxide, safflower yellow, amaranthus red, erythrosine, indigo, new red, plant carbon black and lutein. In some embodiments, the weight ratio of the maltitol, the soluble sugar alcohol and the sorbitol is 1:(0.20-0.50):(0.10-0.20). In some embodiments, the weight ratio of the maltitol to the glycerol is 1:(0.20-0.40). In some embodiments, the weight ratio of the maltitol, the glycerol and the pectin is 1:(0.20-0.40):(0.06-0.10). In some embodiments, the weight ratio of the maltitol, the soluble sugar alcohol and the sorbitol is 1:0.62:0.24, 1:0.12:0.24, 1:0.61:0.04, 1:0.61:0.25, 1:0.12:0.04, 1:0.62:0.04, 1:0.12:0.25, 1:0.20:0.07, 1:0.41:0.12, 1:0.35:0.12, 1:0.30:0.10, 1:0.31:0.12, 1:0.15:0.05, 1:0.49:0.08, 1:0.35:0.04, 1:0.21:0.12 or 1:0.49:0.12. In some embodiments, the weight ratio of the maltitol, the glycerol, and the pectin is 1:0.49:0.11, 1:0.49:0.08, 1:0.49:0.10, 1:0.05:0.09, 1:0.50:0.09, 1:0.05:0.05, 1:0.05:0.06, 1:0.49:0.07, 1:0.05:0.07, 1:0.09:0.07, 1:0.16:0.07, 1:0.27:0.07, 1:0.15:0.08, 1:0.15:0.07, 1:0.41:0.06, 1:0.06:0.06, 1:0.14:0.08, 1:0.14:0.05 or 1:0.16:0.05. In some embodiments, by weight, the soft candies comprise 0-2.5% of the sour agent, 0-0.5% of the fruit juice, 0-30% of nutritional ingredients, 0-1.59% of the edible essence and/or 0-1% of the edible colorant.

Another aspect of the present invention relates to a method for preparing the soft candy according to the present invention, the method comprising the step of mixing sugar alcohol, glycerin and pectin. In some embodiments, the method comprises the following steps: (1) preparation of pectin solution: weighing pectin and soluble sugar alcohol, well-mixing and fully dissolving them with hot water to obtain a pectin solution; (2) cooking: mixing maltitol, sorbitol and water, heating, cooking and concentrating until the solid content is 70%-90%, and the resulting sugar solution is kept warm for later use; (3) blending: adding pectin solution, glycerin, optional nutritional ingredients and optional sour agent to the solution obtained in (2) and blending them to a solid content of 70-80% to obtain a mixed solution, which is kept warm for later use; (4) pouring molding: heating the prepared mixed solution at 85-120° C. and pouring into a mold for molding; (5) drying: drying the obtained soft candies at a drying temperature of 10-60° C. and a relative humidity of 10%-70% RH; (6) demoulding and post-processing: demoulding the dried soft candies, and obtaining the final soft candies after polishing.

Another aspect of the present invention relates to a method for improving the appearance stability and/or mouthfeel of a soft candy, the method comprising preparing the soft candy with sugar alcohol, glycerin and pectin, wherein the sugar alcohol comprises maltitol, one or more soluble sugar alcohols selected from erythritol, isomalt, xylitol, lactitol and mannitol, as well as sorbitol, which is characterized in that the weight ratio of the maltitol, the soluble sugar alcohol and the sorbitol is 1:(0.10-0.65):(0.03-0.26), and the weight ratio of the maltitol to the glycerol is 1:(0.04-0.52). In some embodiments, the weight ratio of the maltitol, the glycerol and the pectin is 1:(0.20-0.40):(0.03-0.11). In some embodiments, the soluble sugar alcohol comprises erythritol. In some embodiments, the soluble sugar alcohol is erythritol. In some embodiments, the sugar alcohol is in solid or liquid form. In some embodiments, by weight, the soft candies comprise 10%-98% of maltitol, 2.0%-20% of soluble sugar alcohol, 0.5%-18% of sorbitol, 0.5%-17% of glycerin and 0.5%-5% of pectin. In some embodiments, the weight ratio of the maltitol, the soluble sugar alcohol and the sorbitol is 1:(0.20-0.50):(0.10-0.20). In some embodiments, the weight ratio of the maltitol to the glycerol is 1:(0.20-0.40). In some embodiments, the weight ratio of the maltitol, the glycerol and the pectin is 1:(0.20-0.40):(0.06-0.10). In some embodiments, the weight ratio of the maltitol, the soluble sugar alcohol and the sorbitol is 1:0.62:0.24, 1:0.12:0.24, 1:0.61:0.04, 1:0.61:0.25, 1:0.12:0.04, 1:0.62:0.04, 1:0.12:0.25, 1:0.20:0.07, 1:0.41:0.12, 1:0.35:0.12, 1:0.30:0.10, 1:0.31:0.12, 1:0.15:0.05, 1:0.49:0.08, 1:0.35:0.04, 1:0.21:0.12 or 1:0.49:0.12. In some embodiments, the weight ratio of the maltitol, the glycerol, and the pectin is 1:0.49:0.11, 1:0.49:0.08, 1:0.49:0.10, 1:0.05:0.09, 1:0.50:0.09, 1:0.05:0.05, 1:0.05:0.06, 1:0.49:0.07, 1:0.05:0.07, 1:0.09:0.07, 1:0.16:0.07, 1:0.27:0.07, 1:0.15:0.08, 1:0.15:0.07, 1:0.41:0.06, 1:0.06:0.06, 1:0.14:0.08, 1:0.14:0.05 or 1:0.16:0.05.

DETAILED DESCRIPTION

Figure 1:
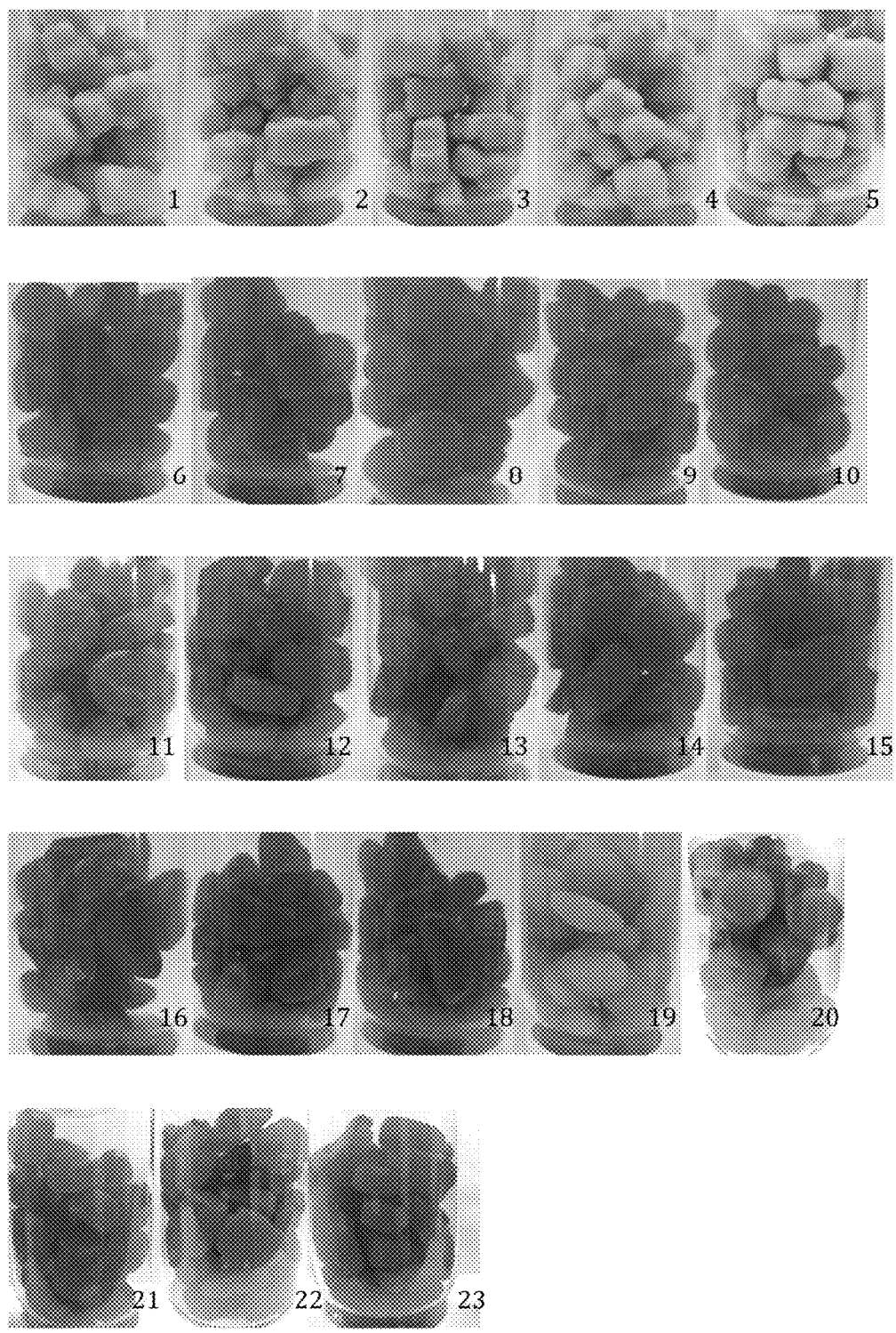
FIG. 1 is a photograph of the soft candies from the various examples according to the present invention, which shows that the water coming out conditions for the appearance of the soft candies of each example after three months of accelerated testing in an accelerated testing box (the temperature of which was 37° C., and the relative humidity (RH) of which was 75%), where the numbers in the lower right corner of each panel correspond to the respective examples, that is, the numbers 1-23 correspond to the examples 1-23 respectively. It can be seen from FIG. 1 that under accelerated conditions, no "water droplets" or "mucus" or very few "water droplets" or "mucus" appeared on the outer layer of each soft candy.

Several aspects of the invention are described below with reference to exemplary applications for illustration. It should be understood that many specific details, relationships and methods are stated to provide a thorough understanding of the present invention. However, those of ordinary skill in the relevant fields will readily recognize that the present invention can be carried out without one or more specific details or can be carried out in other ways.

The present invention provides a low-sugar or sugar-free type pectin soft candy and a preparation method thereof, so that the low-sugar or sugar-free type pectin soft candy can be more stable in quality, and the phenomenon of water coming out of the candy body can be avoided. In addition, the low-sugar or sugar-free type pectin soft candy of the present invention have a sugar body, which is neither too hard nor too soft, as well as an improved appearance and better mouthfeel.

Definition

The terms as used herein are only for the purpose of describing specific embodiments and are not intended to limit the present invention. Unless the context clearly indicates otherwise, the singular forms "a", "an" and "the" as used herein are also intended to include the plural forms. Moreover, the open-ended expressions "include" and "comprise" can also be interpreted as including structural components or method steps that are not mentioned. However, it should be noted that the open-ended expressions also encompass the situations that consist of only the components and method steps described (that is, encompass the case of a closed-ended expression "consisting of").

As used throughout, a range is used as a shorthand for describing each value and all values in the range. Any value in the range, such as an integer value, a value with an increment of hundredth (when the end values of the range have two decimal places) or a value with an increment of one-thousandth (when the end values of the range have three decimal places), can be selected as the end of the range. For example, the range 0.10-0.65 is used to describe all the values in the range, such as 0.10, 0.11, 0.12, 0.13, 0.14, 0.15, 0.16 . . . 0.60, 0.61, 0.62, 0.63, 0.64, and 0.65 (a value with an increment of hundredth), and includes all sub-ranges thereof, such as 0.10-0.20, 0.20-0.30, 0.30-0.40, 0.40-0.50, 0.50-0.60, etc.

As used herein, the phrase "within any range defined between any two foregoing values" literally means that any range can be selected from any two values listed before such phrase, regardless of whether the value is in the lower part of the list or in the higher part of the list. For example, a pair of values can be selected from two lower values, two higher values, or one lower value and one higher value.

Sugar alcohol is a kind of polyhydric alcohol containing two and more hydroxyl groups. However, sugar alcohol is different from polyhydric alcohol such as ethylene glycol, propylene glycol and pentaerythritol synthesized in petrochemical industry. Sugar alcohol can be prepared from a wide range of corresponding sugars, that is, the aldehyde group or ketone group on the sugar molecule is reduced to a hydroxyl group to form sugar alcohol. For example, reduction of glucose produces sorbitol, reduction of xylose produces xylitol, reduction of maltose produces maltitol, and reduction of fructose produces mannitol, etc. What have been currently developed include sorbitol, mannitol, erythritol, maltitol, lactitol, xylitol, etc, and the sugar alcohols have high stability to acid and heat, are not prone to Maillard reaction, become a low-calorie food sweetener and are widely used in low-calorie food formulations.

Since sugar alcohol is neither used by microorganisms in the oral cavity, nor lowers the pH of the oral cavity, but will increase the pH, so it does not corrode the teeth and is a good material for preventing dental caries. Sugar alcohol has no effect on the rise of human blood glucose level and can provide certain calories for diabetic patients, so it can be used as a nutritional sweetener to provide calories for diabetic patients.

The term "sugar-free" as used herein means that the amount of carbohydrate (sugar) per 100 g of solid or 100 ml of liquid food is not more than 0.5 g. The term "low-sugar" as used herein means that the amount of carbohydrates (sugars) per 100 g of solid or 100 ml of liquid food is not more than 5 g.

The phrase "soluble sugar alcohol" as used herein refers to a sugar alcohol that is soluble in water, and in the present invention especially refers to sugar alcohols other than maltitol and sorbitol, such as isomalt, xylitol, lactitol and mannitol. The water solubility can be determined by conventional technical means in the art.

Unless otherwise indicated, all parts and percentages as used herein are percentages by weight.

Unless otherwise specified, all scientific and technological terms as used herein have the meanings commonly understood by those of ordinary skill in the art to which the present invention belongs.

Soft Candy

The soft candy of the present invention comprises sugar alcohol, glycerin and pectin, wherein the sugar alcohol comprises or consist of maltitol, one or more soluble sugar alcohols selected from erythritol, isomalt, xylitol, lactitol and mannitol, as well as sorbitol. In some embodiments, the weight ratio of the maltitol, the soluble sugar alcohol and the sorbitol is 1:(0.10-0.65):(0.03-0.26), for example, 1:(0.10-0.25):(0.12-0.25), 1:(0.20-0.50):(0.10-0.20), 1:(0.30-0.45):(0.06-0.15), 1:(0.50-0.65):(0.08-0.12), etc. In some embodiments, the weight ratio of the maltitol to the glycerol is 1:(0.04-0.52), for example, 1:(0.20-0.40), 1:(0.10-0.15), 1:(0.45-0.50), 1:(0.05-0.16), etc. In some embodiments, the weight ratio of the maltitol, the glycerol and the pectin is 1:(0.04-0.52):(0.03-0.11), for example, 1:(0.04-0.52):(0.05-0.11), 1:(0.20-0.40):(0.06-0.10), 1:(0.10-0.15):(0.06-0.09), 1:(0.45-0.50):(0.05-0.10), 1:(0.05-0.16)):(0.05-0.10), etc. In some embodiments, the weight ratio of the maltitol, the soluble sugar alcohol and the sorbitol is 1:0.62:0.24, 1:0.12:0.24, 1:0.61:0.04, 1:0.61:0.25, 1:0.12:0.04, 1:0.62:0.04, 1:0.12:0.25, 1:0.20:0.07, 1:0.41:0.12, 1:0.35:0.12, 1:0.30:0.10, 1:0.31:0.12, 1:0.15:0.05, 1:0.49:0.08, 1:0.35:0.04, 1:0.21:0.12, or 1:0.49:0.12, or within any range defined between any two of the foregoing values. In some embodiments, the weight ratio of the maltitol, the glycerin, and the pectin is 1:0.49:0.11, 1:0.49:0.08, 1:0.49:0.10, 1:0.05:0.09, 1:0.50:0.09, 1:0.05:0.05, 1:0.05:0.06, 1:0.49:0.07, 1:0.05:0.07, 1:0.09:0.07, 1:0.16:0.07, 1:0.27:0.07, 1:0.15:0.08, 1:0.15:0.07, 1:0.41:0.06, 1:0.06:0.06, 1:0.14:0.08, 1:0.14:0.05 or 1:0.16:0.05, or within any range defined between any two of the foregoing values.

In some embodiments, the maltitol is a maltitol solution. In some embodiments, the maltitol is present in the soft candy in an amount of 10%-98% by weight, such as 10%-15%, 15%-25%, 25%-35%, 35%-70%, 40%-65%, 45%-60% or 50%-55%, or may be present in the soft candy, for example in an amount within any range defined between any two of the foregoing values. In some embodiments, the soluble sugar alcohol is present in the soft candy in an amount of 2.0%-20% by weight, such as 2.0%-15%, 2.0%-12%, 2.0%-10%, 2.0%-5.0% or 3.0%-4.0%, or may be present in the soft candy, for example in an amount within any range defined between any two of the foregoing values. In some embodiments, the sorbitol is a sorbitol solution. In some embodiments, the sorbitol is present in the soft candy in an amount of 0.5%-18% by weight, such as 0.5%-1.0%, 1.0%-15%, 2.0%-10%, 3.0%-9.0% or 4.0%-8.0%, or may be present in the soft candy, for example in an amount within any range defined between any two of the foregoing values. In some embodiments, the glycerol is present in the soft candy in an amount of 0.5%-17% by weight, such as 0.8%-16%. 1.0%-15%, 2.0%-11%, 3.0%-9.0%, 4.0%-8.0% or 7.0%-9.0%, or may be present in the soft candy, for example in an amount within any range defined between any two of the foregoing values. In some embodiments, the pectin is present in the soft candy in an amount of is 0.5%-5% by weight, such as 1%-3%, 1%-2%, 1.5%-2%, 1.5%-1.8% or 1.7%-1.8%, or may be present in the soft candy, for example in an amount within any range defined between any two of the foregoing values.

In some embodiments, the sour agent is present in the soft candy in an amount of 0-2.5% by weight, such as 0.3%-2.0%, 0.5%-1.0%, 0.8%-1.0%, 1.2%-1.8% or 1.3%-1.5%. In some embodiments, the fruit juice is present in the soft candy in an amount of 0-0.5% by weight, such as 0.1%-0.4% or 0.2%-0.3%. In some embodiments, the nutritional ingredient is present in the soft candy in an amount of 0-30% by weight, such as 0.01%-20%, 0.1%-10%, 1%-15%, 2%-8% or 3%-5%. In some embodiments, the edible essence is present in the soft candy in an amount of 0-1.5% by weight, such as 0.2%-1.0%, 0.3%-0.8% or 0.5%-0.7%. In some embodiments, the edible colorant is present in the soft candy in an amount of 0-1% by weight, such as 0.2%-1.0%, 0.3%-0.8% or 0.5%-0.7%. In some embodiments, water is present in the soft candy in an amount of 3%-30% by weight, such as 10%-30% or 20%-25%.

The useful sour agents, fruit juices, nutritional ingredients, edible essences and edible colorants may be the sour agents, fruit juices, nutritional ingredients, edible essences and edible colorants as described in the "Summary of the Invention" section. In a preferred embodiment, the juice is apple juice. In a preferred embodiment, the nutritional ingredient is selected from milk mineral salts, calcium, lutein esters, vitamin C, vitamin A, ferrous fumarate, tricalcium phosphate, vitamin E acetate, vitamin B1, vitamins B2, vitamin B6, vitamin A, krill oil and combinations thereof. In a preferred embodiment, the sour agent is selected from citric acid, potassium citrate, sodium citrate and combinations thereof. In a preferred embodiment, the edible essence is selected from strawberry essence, orange essence, lemon essence and combinations thereof. In a preferred embodiment, the edible colorant is selected from the group consisting of cochineal, annatto, radish red and combinations thereof.

In addition, the soft candy of the present invention may optionally contain other additives and ingredients. The soft candy may include candy flavoring agents, such as peanut butter flavors, vanilla flavors, chocolate flavors, etc., and combinations thereof. The soft candy may also include processing aids, such as those commonly used in candy technology. Additional flavoring agents, seasonings, coloring agents, inclusions, preservatives, antioxidants, excipients, etc., and combinations thereof may also be included in the soft candy in small amounts.

The soft candy of the present invention may optionally contain vitamins, minerals, antioxidants, amino acids, essential oils, herbs and polyphenols. Preferred vitamins are, for example, vitamin A, vitamin C, vitamin D, vitamin E, vitamin K and its derivatives and/or provitamins. Preferred vitamins also include B-vitamins such as biotin, folic acid, niacin, nicotinamide, pantothenate, pyridoxine hydrochloride, riboflavin, thiamine hydrochloride and the like. Minerals may include, but are not limited to, bromine, calcium, chromium, copper, iodine, iron, magnesium, manganese, phosphate, phosphorus, potassium, selenium, sodium, sulfur, and zinc. Amino acids include, for example, arginine, histidine, isoleucine, leucine, lysine, methionine, phenylalanine, threonine, tryptophan, valine, alanine, aspartic acid, glutamic acid, glutamine, glycine, serine, tyrosine, creatine, etc.

Preparation Method

The soft candy of the present invention can be prepared as follows:

(1) Preparation of Pectin Solution

Weighing pectin and soluble sugar alcohol, well-mixing and fully dissolving them with hot water to obtain pectin solution;

(2) Cooking

Mixing maltitol, sorbitol and water, heating, cooking and concentrating until the solid content is 70%-90%, and the resulting sugar solution is kept warm for later use;

(3) Blending

Adding pectin solution, glycerin, optional nutritional ingredients and optional sour agent to the solution obtained in (2) and blending them to a solid content of 70-80% to obtain a mixed solution, which is kept warm for later use;

(4) Pouring Molding

Heating the prepared mixed solution at 85-120° C. and pouring into a mold for molding;

(5) Drying

Drying the obtained soft candies at a drying temperature of 10-60° C. and a relative humidity of 10%-70% RH;

(6) Demoulding and Post-Processing

Demoulding the dried soft candies, and obtaining the final soft candies after polishing.

Methods for Improving Appearance Stability and/or Mouthfeel

There is a common problem with soft candies, that is, the quality of the product is very unstable. After being placed for a period of time, the gel system is destroyed with the occurrence of water coming out of the candy body and "water droplets" or "mucus" appearing on the surface, which not only affects the senses of the product, but also seriously affects the internal quality of the product such as chewiness, mouthfeel and content etc. Therefore, in one aspect, the present invention relates to a method for improving the appearance stability and/or mouthfeel of a soft candy, the method comprising preparing the soft candy with sugar alcohol, glycerin and pectin, wherein the sugar alcohol, glycerin and pectin are as defined in the "soft candy" section of the present invention. In some embodiments, the soft candy may contain other ingredients as defined in the "soft candy" section of the present invention, such as a sour agent, a fruit juice, a nutritional ingredient, an edible essence, an edible colorant, and other additives and ingredients.

Although various embodiments of the present invention have been described above, it should be understood that they are provided by way of example only, and are non-limiting. Many changes to the embodiments of the present disclosure can be made in accordance with the present disclosure without departing from the spirit or scope of the present invention. Therefore, the breadth and scope of the present invention should not be limited by any of the above-mentioned embodiments.

EXAMPLES

Unless otherwise stated, all the materials used in the Examples herein are commercially available and the various specific experimental methods used to perform the experiments are those routinely used in the art or in accordance with the steps and conditions recommended by the manufacturer and can be routinely determined by those skilled in the art as needed. Some materials and methods are detailed below.

Materials.

| Materials | CNS No. | INS No. | Supplier | Notes |
|---|---|---|---|---|
| Maltitol Solution | 19.022 | 965(ii) | Guangzhou Daoming Chemical Co., Ltd. | |
| Sorbitol Solution | 19.023 | 420(ii) | Guangzhou Daoming Chemical Co., Ltd. | |
| Pectin powder | 20.006 | 440 | Guangzhou Carelife Food Additives Co., Ltd. | |
| Milk Mineral Salt | / | / | Shanghai Prochin International Trading Co., Ltd. | New Resource Food |
| Glycerin | 15.014 | 422 | Wilmar (China) Oleo Co., Ltd. | |
| Erythritol | 19.018 | 968 | Shantou Jiekang Food Technology Co., Ltd. | |

Examples 1-23 and Comparative Examples 1, 6, 12 and 16

The low-sugar or sugar-free type pectin soft candies of examples 1-23 and comparative examples 1, 6, 12, and 16 were prepared according to the formula composition in tables 1-3 below.

TABLE 1

Formulations of Examples 1-12 (unit: parts by weight).

| Formula Composition | 1 | 2 | 3 | 4 | 5 | 6 | 7 | 8 | 9 | 10 | 11 | 12 |
|---|---|---|---|---|---|---|---|---|---|---|---|---|
| Maltitol Solution (Containing 40.7% of Maltitol) | 467 | 552 | 512 | 539 | 468 | 962 | 778 | 843 | 829 | 955 | 870 | 761 |
| Sorbitol Solution (Containing 50% Sorbitol) | 93 | 110 | 17 | 108 | 94 | 32 | 26 | 169 | 28 | 32 | 48 | 76 |
| Erythritol | 117 | 27 | 128 | 134 | 117 | 48 | 195 | 42 | 41 | 48 | 72 | 126 |
| Isomalt | / | / | / | / | / | / | / | / | / | / | / | / |
| Xylitol | / | / | / | / | / | / | / | / | / | / | / | / |
| Mannitol | / | / | / | / | / | / | / | / | / | / | / | / |
| Lactitol | / | / | / | / | / | / | / | / | / | / | / | / |
| Pectin Powder (Containing 88% of Pure Pectin) | 23 | 21 | 23 | 23 | 20 | 24 | 22 | 25 | 28 | 30 | 29 | 23 |
| Glycerin | 94 | 110 | 102 | 11 | 95 | 20 | 16 | 17 | 166 | 19 | 31 | 50 |
| Milk Mineral Salt | / | / | / | / | / | / | / | / | / | / | / | / |
| Calcium | 213 | 213 | 213 | 213 | 213 | / | / | / | / | / | / | / |

TABLE 1-continued

Formulations of Examples 1-12 (unit: parts by weight).

| Formula Composition | 1 | 2 | 3 | 4 | 5 | 6 | 7 | 8 | 9 | 10 | 11 | 12 |
|---|---|---|---|---|---|---|---|---|---|---|---|---|
| Lutein Ester | / | / | / | / | / | / | / | / | / | / | 20 | 20 |
| Vitamin C | / | / | / | / | / | / | / | / | / | / | / | / |
| Vitamin A | / | / | / | / | / | 0.16 | 0.16 | 0.16 | 0.16 | 0.16 | / | / |
| Sodium Citrate | 4 | 4 | 4 | 4 | 4 | 2 | 2 | 2 | 2 | 2 | / | / |
| Citric Acid | 17 | 17 | 17 | 17 | 17 | 10 | 10 | 10 | 10 | 10 | 6 | 6 |
| Orange Essence | 3 | 3 | 3 | 3 | 3 | 3 | 3 | 3 | 3 | 3 | 3 | 3 |
| Radish Red | / | / | / | / | / | 1.3 | 1.3 | 1.3 | 1.3 | 1.3 | / | / |
| Water | 300 | 270 | 300 | 300 | 290 | 310 | 290 | 330 | 370 | 390 | 380 | 300 |

TABLE 2

Formulations of Examples 13-23 (unit: parts by weight).

| Formula Composition | 13 | 14 | 15 | 16 | 17 | 18 | 19 | 20 | 21 | 22 | 23 |
|---|---|---|---|---|---|---|---|---|---|---|---|
| Maltitol Solution (Containing 40.7% Maltitol) | 778 | 739 | 798 | 796 | 714 | 914 | 716 | 873 | 778 | 849 | 770 |
| Sorbitol Solution (Containing 50% Sorbitol) | 77 | 74 | 66 | 80 | 70 | 38 | 48 | 29 | 26 | 85 | 77 |
| Erythritol | 111 | 123 | 99 | 100 | 119 | 57 | 143 | / | / | / | / |
| Isomalt | / | / | / | / | / | / | / | 125 | / | / | / |
| Xylitol | / | / | / | / | / | / | / | / | 194 | / | / |
| Mannitol | / | / | / | / | / | / | / | / | / | 71 | / |
| Lactitol | / | / | / | / | / | / | / | / | / | / | 154 |
| Pectin Powder (Containing 88% of Pure Pectin) | 25 | 23 | 30 | 24 | 21 | 26 | 25 | 23 | 22 | 20 | 18 |
| Glycerin | 50 | 80 | 50 | 50 | 120 | 23 | 40 | 17 | 16 | 50 | 50 |
| Milk Mineral Salt | / | / | / | / | / | / | 80 | / | / | / | / |
| Calcium | / | / | / | / | / | / | / | / | / | / | / |
| Lutein Ester | 20 | 20 | 20 | / | / | / | / | / | / | 7 | 7 |
| Vitamin C | / | / | / | 26 | 26 | 26 | / | / | / | / | / |
| Vitamin A | / | / | / | / | / | / | / | 0.16 | 0.16 | / | / |
| Sodium Citrate | / | / | / | 1 | 1 | 1 | 2 | / | / | / | / |
| Citric Acid | 6 | 6 | 6 | 3 | 3 | 3 | 10 | 6 | 6 | 6 | 6 |
| Orange Essence | 3 | 3 | 3 | 3 | 3 | 3 | 3 | 3 | 3 | 3 | 3 |
| Radish Red | / | / | / | 1.2 | 1.2 | 1.2 | / | 1.3 | 1.3 | / | / |
| Water | 330 | 300 | 390 | 310 | 270 | 340 | 330 | 300 | 290 | 260 | 230 |

TABLE 3

Formulations of Comparative Examples (unit: parts by weight).

| Formula Composition | 1 | 6 | 12 | 16 |
|---|---|---|---|---|
| Maltitol Solution (Containing 40.7% Maltitol) | 461 | 928 | 791 | 809 |
| Sorbitol Solution (Containing 50% Sorbitol) | / | 46 | 93 | 80 | 81 |
| Erythritol | / | 153 | 31 | 132 | 101 |
| Pectin Powder (Containing 88% of Pure Pectin) | 23 | 24 | 30 | 9.5 |
| Glycerin | 95 | 19 | 1 | 50 |
| Milk Mineral Salt | / | / | / | / |
| Galcium | 213 | / | / | / |
| Lutein Ester | / | / | 20 | / |

TABLE 3-continued

Formulations of Comparative Examples (unit: parts by weight).

| Formula Composition | 1 | 6 | 12 | 16 |
|---|---|---|---|---|
| Vitamin C | / | / | / | 26 |
| Vitamin A | / | 0.2 | / | / |
| Sodium Citrate | 4 | 2 | / | / |
| Citric Acid | 17 | 10 | 6 | 3 |
| Orange Essence | 3 | 3 | 3 | 3 |
| Radish Red | / | 1.3 | / | 1.2 |
| Water | 300 | 310 | 390 | 200 |

The low-sugar or sugar-free type pectin soft candies of the examples and comparative examples were prepared as follows:

(1) Preparation of Pectin Solution

Weighing the above-mentioned pectin powder and soluble sugar alcohol (erythritol, isomalt, xylitol, lactitol or mannitol), well-mixing and then fully dissolving them with hot water to obtain pectin solution;

(2) Cooking

Mixing the above-mentioned maltitol solution and sorbitol solution, heating, cooking and concentrating until the solid content is 70%-90%, and the resulting sugar solution is kept warm for later use;

(3) Blending

Adding pectin solution, glycerin, nutritional ingredients and the sour agent to the solution obtained in (2) and blending them to a solid content of 70-80% to obtain a mixed solution, which is kept warm for later use;

(4) Pouring Molding

Heating the prepared mixed solution at 85-120° C. and pouring into a mold for molding;

(5) Drying

Drying the obtained low-sugar or sugar-free type pectin soft candies under the conditions of a drying temperature of 10-60° C. and a relative humidity of 10%-70% RH;

(6) Demoulding and Post-Processing

Demoulding the dried low-sugar or sugar-free type pectin soft candies, and obtaining the low-sugar or sugar-free type pectin soft candies after polishing.

Figure 2:
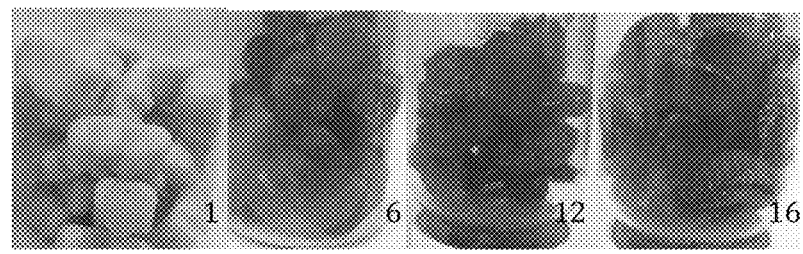
FIG. 2 is a photograph of the soft candies from the various comparative examples according to the present invention, which shows that the water coming out conditions for the appearance of the soft candies of each comparative example after three months of accelerated testing in an accelerated testing box (the temperature of which was 37° C., and the relative humidity (RH) of which was 75%), where the numbers in the lower right corner of each panel correspond to the respective comparative examples, that is, the numbers 1, 6, 12 and 16 correspond to the comparative examples 1, 6, 12 and 16 respectively. It can be seen from FIG. 2 that under accelerated conditions, many "water droplets" or "mucus" appeared on the outer layer of each soft candy, which resulted in mist.

The soft candies from Examples 1-23 and Comparative Examples 1, 6, 12, and 16 were placed in an accelerated testing box (the temperature of which was 37° C., and the relative humidity (RH) of which was 75%) for accelerated testing for three months, and the water coming out conditions for the appearance of the soft candies were observed. After three months of accelerated testing, the water coming out conditions for the appearance of the soft candies from each example were shown in FIGS. 1 and 2. According to the comparison of the water coming out conditions of the examples and the comparative examples in FIGS. 1 and 2, it can be seen that the phenomenon of water coming out of products during storage can be avoided by controlling the ratio of maltitol, soluble sugar alcohols (such as erythritol, isomalt, xylitol, lactitol or mannitol) and sorbitol, as well as the ratio of maltitol to glycerin, especially the ratio of maltitol, glycerin and pectin in the range of the present invention.

Texture Scoring

The soft candy products from the examples and the comparative examples were tested using the TA texture analyzer through the TPA mode (with controlling the specifications and shape of the finished products to be consistent, cylindrical, 2.5 g/grain), respectively. Each group of samples was tested 10 times in parallel, and the hardness and viscosity results are as follows:

TABLE 4

Texture Scoring Criteria.

| Item | Scoring Criteria | score |
|---|---|---|
| Hardness (50) | (18000-25000) moderately soft and hard, like | 50 |
| | (25000-35000) slightly harder, generally like; | 30 |
| | (≤18000 或 ≥35000) too soft or too hard, dislike; | 10 |
| Viscosity (50) | (0-1) less viscous, like | 50 |
| | (−1-0) slightly viscous, generally like | 30 |
| | (≤−1) viscous, dislike | 10 |

TABLE 5

Texture Scoring Table of Examples and Comparative Examples.

| Case | Hardness | Viscosity | Total Score |
|---|---|---|---|
| Example 1 | 34000 | 0.1 | 80 |
| Comparative Example 1 | 42000 | −0.8 | 40 |
| Example 2 | 30000 | 0.2 | 80 |
| Example 3 | 30000 | 0.3 | 80 |
| Example 4 | 34000 | 0.2 | 80 |
| Example 5 | 26000 | 0.4 | 80 |
| Example 6 | 21000 | 0.5 | 100 |
| Comparative Example 6 | 17000 | −0.3 | 40 |
| Example 7 | 31000 | 0.1 | 80 |
| Example 8 | 19000 | 0.3 | 100 |
| Example 9 | 19000 | −0.2 | 80 |
| Example 10 | 33000 | 0.1 | 80 |
| Example 11 | 32000 | 0.1 | 80 |
| Example 12 | 23000 | −0.1 | 80 |
| Comparative Example 12 | 26000 | −0.4 | 60 |
| Example 13 | 22000 | 0.2 | 100 |
| Example 14 | 23000 | −0.1 | 80 |
| Example 15 | 24000 | 0.1 | 100 |
| Example 16 | 28000 | 0.2 | 80 |
| Comparative Example 16 | 17500 | −0.4 | 40 |
| Example 17 | 24500 | 0.2 | 100 |
| Example 18 | 19000 | 0.1 | 100 |
| Example 19 | 24000 | −0.2 | 80 |
| Example 20 | 26000 | 0.5 | 80 |
| Example 21 | 23000 | −0.2 | 80 |
| Example 22 | 24000 | −0.5 | 80 |
| Example 23 | 24500 | −0.7 | 80 |

From table 5, example 1 and comparative example 1, as well as example 6 and comparative example 6, it can be seen that when the ratio of maltitol, soluble sugar alcohol (such as erythritol), and sorbitol exceeds the specified range, there is water coming out of the product, and the viscosity of the product is high. It can also be seen from comparative example 1 that when the proportion of soluble sugar alcohol (such as erythritol) among the three ingredients is increased, the hardness of the product becomes greater. From example 12 and comparative example 12, example 16 and comparative example 16, it can be seen that when the ratio of maltitol to glycerin and/or pectin exceeds the specified range, the products all appear water coming out phenomenon, and the products are highly viscous. It can be seen from comparative example 12 that when the proportion of glycerin among the three ingredients is reduced, the product becomes harder, and it can be seen from comparative example 16 that when the proportion of pectin among the three ingredients becomes smaller, the product becomes softer. The above experimental results show that products with soft mouthfeel, stable appearance, and no water coming out during storage were obtained through controlling the ratio of maltitol to soluble sugar alcohol (such as, erythritol), the ratio of maltitol to sorbitol, the ratio of maltitol to glycerol, and optionally the ratio of maltitol to pectin within the specified ranges of the present invention.

What is claimed is:

1. A soft candy comprising 10%-30% by weight of water, sugar alcohol, glycerin and pectin, wherein the sugar alcohol comprises maltitol, one or more soluble sugar alcohols selected from erythritol, isomalt, xylitol, lactitol and mannitol, as well as sorbitol, which is characterized in that the weight ratio of the maltitol, the one or more soluble sugar alcohols and the sorbitol is 1:(0.10-0.65):(0.03-0.26), the weight ratio of the maltitol to the glycerin is 1:(0.04-0.52), and the weight ratio of the maltitol, the glycerin and the pectin is 1:(0.04-0.52):(0.03-0.11).

2. The soft candy of claim 1, which is characterized in that the sugar alcohol consists of the maltitol, the one or more soluble sugar alcohols and the sorbitol; optionally the one or more soluble sugar alcohols are erythritol; optionally the sugar alcohol is in solid or liquid form; optionally by weight, the soft candy contains 10%-98% of maltitol, 2.0%-20% of the one or more soluble sugar alcohols, 0.5%-18% of sorbitol, 0.5%-17% of glycerin and 0.5%-5% of pectin.

3. The soft candy of claim 1, which is characterized in that the soft candy comprises one or more ingredients selected from the group consisting of a sour agent, a fruit juice, a nutritional ingredient, an edible essence and an edible colorant; optionally the sour agent is selected from one or more of the following: citric acid, malic acid, lactic acid, tartaric acid, fumaric acid, and edible salts thereof; optionally the edible salt is sodium citrate and/or potassium citrate; optionally the fruit juice is selected from one or more of the following: apple juice, raspberry juice, blueberry juice, strawberry juice, cherry juice, lemon juice, peach juice, orange juice, banana juice, pear juice, sugar cane juice, compound berry juice, grape juice, jujube juice, lychee juice, wolfberry juice, pomegranate juice, blackcurrant juice, carrot juice, raspberry juice, noni fruit juice, ebony juice, fermented fruit and vegetable juice, cranberry juice, green plum juice, sea buckthorn juice, kiwi juice, mango juice, celery juice and carrot juice; optionally the nutritional ingredient is one or a mixture of two or more of the nutritional ingredients allowed to be used according to the 2012 version of the GB 14880 standards for use of nutritional ingredients; optionally the nutritional ingredient is selected from one or more of the following: minerals, vitamins, amino acids, proteins, polyphenols, glycosides, flavonoids, lipids, polysaccharides, terpenes, sterols, omega polyunsaturated fatty acids, yeast ß-glucan, L-carnitine, melatonin and coenzyme Q10; optionally the minerals are selected from one or more of the following: calcium, iron, zinc, selenium, magnesium, potassium, sodium, manganese, and copper; optionally the vitamins are selected from one or more of the following: vitamin A, vitamin D, vitamin E, vitamin C, B-vitamins, folic acid, and biotin; optionally the amino acids are taurine and/or lysine; optionally the omega polyunsaturated fatty acid is an omega-3 polyunsaturated fatty acid; optionally the omega-3 polyunsaturated fatty acid is DHA or EPA; optionally the nutritional ingredient is milk mineral salt; optionally the edible essence is selected from one or more of the following: orange essence, lemon essence, strawberry essence, raspberry essence, blueberry essence, peach essence, cola essence, cherry essence, banana essence, pear essence, black carrot essence, compound berry essence, grape essence, jujube essence, lychee essence, wolfberry essence, pomegranate essence, black currant essence, carrot essence, raspberry essence, noni fruit essence, ebony essence, fermented fruit and vegetable essence, cranberry essence, green plum essence, sea buckthorn essence, kiwi essence, mango essence, mixed fruit essence, cucumber essence, caramel essence, coffee essence and honey essence; optionally the edible colorant is selected from one or more of the following: annatto, cochineal, beta carotene, turmeric, caramel, titanium dioxide, lemon yellow, brilliant blue, allura red, capsicum red, grape skin red, Monascus colour, beet red, gardenia blue, gardenia yellow, radish red, sunset yellow, sodium copper chlorophyll, iron oxide, safflower yellow, amaranthus red, erythrosine, indigo, new red, plant carbon black and lutein.

4. The soft candy of claim 1, which is characterized in that the weight ratio of the maltitol, the one or more soluble sugar alcohols and the sorbitol is 1:(0.20-0.50):(0.10-0.20); optionally, the weight ratio of the maltitol to the glycerin is 1:(0.20-0.40); optionally, the weight ratio of the maltitol, the glycerin and the pectin is 1:(0.20-0.40):(0.06-0.10).

5. The soft candy of claim 1, which is characterized in that the soft candy is of a low-sugar or sugar-free type.

6. A method for preparing the soft candy of claim 1, which is characterized in that the method comprises the step of mixing sugar alcohol, glycerin and pectin.

7. A method for improving the appearance stability and/or mouthfeel of a soft candy, comprising preparing the soft candies with sugar alcohol, glycerin and pectin, wherein the soft candies comprise 10%-30% by weight of water, and the sugar alcohol comprises maltitol, one or more soluble sugar alcohols selected from erythritol, isomalt, xylitol, lactitol and mannitol, as well as sorbitol, which is characterized in that the weight ratio of the maltitol, the one or more soluble sugar alcohols and the sorbitol is 1:(0.10-0.65):(0.03-0.26), the weight ratio of the maltitol to the glycerin is 1:(0.04-0.52), and the weight ratio of the maltitol, the glycerin and the pectin is 1:(0.04-0.52):(0.03-0.11).

8. The method of claim 7, which is characterized in that one or more soluble sugar alcohols are erythritol; optionally the sugar alcohol is in solid or liquid form; optionally by weight, the soft candy comprises 10%-98% of maltitol, 2.0%-20% of the one or more soluble sugar alcohols, 0.5%-18% of sorbitol, 0.5%-17% of glycerin and 0.5%-5% of pectin.

9. The method of claim 7, which is characterized in that the weight ratio of the maltitol, the one or more soluble sugar alcohols and the sorbitol is 1:(0.20-0.50):(0.10-0.20); optionally the weight ratio of the maltitol to the glycerin is 1:(0.20-0.40); optionally the weight ratio of the maltitol, the glycerin and the pectin is 1:(0.20-0.40):(0.06-0.10).

10. The method of claim 8, which is characterized in that the weight ratio of the maltitol, the one or more soluble sugar alcohols and the sorbitol is 1:(0.20-0.50):(0.10-0.20); optionally the weight ratio of the maltitol to the glycerin is 1:(0.20-0.40); optionally the weight ratio of the maltitol, the glycerin and the pectin is 1:(0.20-0.40):(0.06-0.10).

* * * * *